United States Patent
Oda et al.

(10) Patent No.: US 12,359,019 B2
(45) Date of Patent: Jul. 15, 2025

(54) PREPREG, METHOD FOR PRODUCING SAME, AND METHOD FOR PRODUCING FIBER-REINFORCED COMPOSITE MATERIAL

(71) Applicant: TEIJIN LIMITED, Osaka (JP)

(72) Inventors: Akimichi Oda, Osaka (JP); Hiroaki Kuwahara, Osaka (JP); Hironori Kawamoto, Osaka (JP)

(73) Assignee: TEIJIN LIMITED, Osaka (JP)

( * ) Notice: Subject to any disclaimer, the term of this patent is extended or adjusted under 35 U.S.C. 154(b) by 0 days.

(21) Appl. No.: 18/210,769

(22) Filed: Jun. 16, 2023

(65) Prior Publication Data

US 2023/0331906 A1 Oct. 19, 2023

Related U.S. Application Data

(63) Continuation of application No. 16/768,407, filed as application No. PCT/JP2018/043881 on Nov. 28, 2018, now Pat. No. 11,820,858.

(30) Foreign Application Priority Data

Dec. 1, 2017 (JP) ................ 2017-231939
Mar. 23, 2018 (JP) ................ 2018-056913

(51) Int. Cl.
*C08G 59/50* (2006.01)
*C08J 5/24* (2006.01)

(52) U.S. Cl.
CPC ............. *C08G 59/50* (2013.01); *C08J 5/243* (2021.05); *C08J 2363/00* (2013.01); *C08J 2377/00* (2013.01); *C08J 2381/06* (2013.01)

(58) Field of Classification Search
CPC ....... C08G 59/50; C08J 5/243; C08J 2363/00; C08J 2377/00; C08J 2381/06
USPC ...................................... 264/136
See application file for complete search history.

(56) References Cited

U.S. PATENT DOCUMENTS

| | | |
|---|---|---|
| 4,663,401 A | 5/1987 | Saito et al. |
| 5,169,710 A | 12/1992 | Qureshi et al. |
| 2011/0218272 A1 | 9/2011 | Numata et al. |
| 2013/0344305 A1 | 12/2013 | Hatanaka et al. |
| 2015/0166743 A1 | 6/2015 | Restuccia et al. |
| 2015/0210813 A1 | 7/2015 | Arai et al. |
| 2017/0226299 A1* | 8/2017 | Arai ................ C08L 71/12 |
| 2018/0258240 A1 | 9/2018 | Mutsuda et al. |
| 2020/0291198 A1 | 9/2020 | Oda et al. |

FOREIGN PATENT DOCUMENTS

| | | | |
|---|---|---|---|
| EP | 0493786 A2 | 7/1992 | |
| EP | 2947109 A1 | 11/2015 | |
| JP | 60-243113 A | 12/1985 | |
| JP | 07-041575 A | 2/1995 | |
| JP | 07-041576 A | 2/1995 | |
| JP | 07-041577 A | 2/1995 | |
| JP | 2014-141656 A | 8/2014 | |
| JP | 2017-501904 A | 1/2017 | |
| WO | 2015/130368 A2 | 9/2015 | |
| WO | WO-2015146781 A1 * | 10/2015 | ............. C08J 5/042 |
| WO | 2017/061502 A1 | 4/2017 | |

OTHER PUBLICATIONS

Communication pursuant to Rule 114(2) EPC issued Apr. 6, 2022 in European Application No. 18884706.5.
"Amorphous vs. Crystalline Polymers", Polymer Questions, Nov. 10, 2020 https://www.mcpolymers.com/library/amorphous-vs-crystalline-polymers (11 pages total).
International Search Report for PCT/JP2018/043881 dated Feb. 12, 2019 [PC/ISA/210].

* cited by examiner

Primary Examiner — David T Karst
(74) Attorney, Agent, or Firm — Sughrue Mion, PLLC

(57) ABSTRACT

According to the present invention, there is provided a prepreg characterized by including a reinforcing fiber substrate composed of a reinforcing fiber, and an epoxy resin composition with which the reinforcing fiber substrate is partially or wholly impregnated, in which the epoxy resin composition includes, as an essential component, an epoxy resin, an amine-based curing agent, and a polyamide particle, the epoxy resin composition includes, as an optional component, an epoxy resin-soluble thermoplastic resin; and an epoxy group is introduced to the surface of the polyamide particle, and/or at least one of the epoxy resin, the amine-based curing agent, and the epoxy resin-soluble thermoplastic resin, included in the epoxy resin composition, partially permeates into the polyamide particle.

8 Claims, No Drawings

PREPREG, METHOD FOR PRODUCING SAME, AND METHOD FOR PRODUCING FIBER-REINFORCED COMPOSITE MATERIAL

CROSS REFERENCE TO RELATED APPLICATIONS

This application is a Continuation of application Ser. No. 16/768,407 filed May 29, 2020, which is a National Stage of International Application No. PCT/JP2018/043881 filed Nov. 28, 2018, claiming priority based on Japanese Patent Application No. 2017-231939 filed Dec. 1, 2017 and Japanese Patent Application No. 2018-056913 filed Mar. 23, 2018. The disclosure of application Ser. No. 16/768,407 is hereby incorporated by reference.

TECHNICAL FIELD

The present invention relates to a prepreg, a method for producing the prepreg, and a method for producing a fiber-reinforced composite material. More specifically, it relates to a prepreg for producing a fiber-reinforced composite material having high mode I interlaminar toughness (GIc), a method for producing the prepreg, and a method for producing a fiber-reinforced composite material produced by using the prepreg.

BACKGROUND ART

A fiber-reinforced composite material including a reinforcing fiber and a resin has advantages such as light weight, high strength, and high elastic modulus and is widely used in an aircraft, sport and leisure, and general industries. This fiber-reinforced composition material is produced in many cases via a prepreg in which a reinforcing fiber and a resin called a matrix resin are integrated with each other in advance.

As a resin constituting a prepreg, a prepreg using a thermosetting resin is widely used due to tack properties and drape properties of the prepreg which allow a high degree of freedom in molding. The fiber-reinforced composition material, which is often used as a laminated plate, has a problem of having low interlaminar strength and easily causing interlaminar separation as the reinforcing fiber is not oriented in a plate thickness direction. Thus, a method for improving the interlaminar strength has been studied.

As a method for improving the interlaminar strength, the methods described in Patent Literatures 1 to 4 have been conventionally known.

Patent Literature 1 describes a method of providing toughness to a thermosetting resin by dissolving a thermoplastic resin in the thermosetting resin. This method can provide toughness to the thermosetting resin to some extent. However, a large amount of the thermoplastic resin needs to be dissolved in the thermosetting resin to provide high toughness. As a result, the thermosetting resin dissolving a large amount of the thermoplastic resin has a significant increase in viscosity, making it difficult to impregnate a reinforcing fiber substrate formed from a carbon fiber with a sufficient amount of the resin. The fiber-reinforced composition material produced by using such a prepreg includes many defects such as a void. As a result, compression performance and damage tolerance of the fiber-reinforced composition material are negatively affected.

Patent Literatures 2 to 4 describe prepregs in which a thermoplastic resin fine particle is localized to the prepreg surface. In these prepregs, the thermoplastic resin fine particle functions as an interlaminar particle, however, no description of the surface state of the interlaminar particle is given.

CITATION LIST

Patent Literature

Patent Literature 1: JP 60-243113 A
Patent Literature 2: JP H07-41575 A
Patent Literature 3: JP H07-41576 A
Patent Literature 4: JP H07-41577 A

SUMMARY OF INVENTION

Technical Problem

An object of the present invention is to solve the aforementioned problems of the prior art by providing a prepreg that allows production of a fiber-reinforced composite material having high mode I interlaminar toughness (GIc), a method for producing the prepreg, and a method for producing a fiber-reinforced composite material produced by using the prepreg.

Solution to Problem

As a result of studies for solving the aforementioned problems, the present inventors have found that, when a polyamide particle is used as an interlaminar particle and interfacial adhesion between the polyamide particle and an epoxy resin is improved, a resulting fiber-reinforced composite material can improve in mode I interlaminar toughness (GIc), thereby completing the present invention. Further, the present inventors have found that a surface state of the polyamide particle can be uniformized by subjecting the polyamide particle to a heat treatment and/or a surface modification, thereby completing the present invention.

The present invention to solve the aforementioned problems is as follows.

A prepreg characterized by including:
a reinforcing fiber substrate composed of a reinforcing fiber; and
an epoxy resin composition with which the reinforcing fiber substrate is partially or wholly impregnated, in which
the epoxy resin composition includes, as an essential component, an epoxy resin, an amine-based curing agent, and a polyamide particle,
the epoxy resin composition includes, as an optional component, an epoxy resin-soluble thermoplastic resin, and
an epoxy group is introduced to the surface of the polyamide particle, and/or
at least one of the epoxy resin, the amine-based curing agent, and the epoxy resin-soluble thermoplastic resin, included in the epoxy resin composition, partially permeates into the polyamide particle.

The invention described above is divided into the following [1] to [5].

[1] A prepreg including:
a reinforcing fiber substrate composed of a reinforcing fiber; and
an epoxy resin composition with which the reinforcing fiber substrate is partially or wholly impregnated, in which the epoxy resin composition includes an epoxy resin, an amine-based curing agent, and a polyamide particle, and the epoxy resin and/or the amine-based curing agent partially permeates into the polyamide particle.

The invention described in the above [1] is the prepreg prepared by impregnating the reinforcing fiber substrate with the epoxy resin composition including at least the epoxy resin, the amine-based curing agent, and the polyamide particle. This prepreg is characterized in that the epoxy resin and/or the amine-based curing agent partially permeate(s) into the polyamide particle.

[2] A prepreg including:
a reinforcing fiber substrate composed of a reinforcing fiber; and an epoxy resin composition with which the reinforcing fiber substrate is partially or wholly impregnated, in which
the epoxy resin composition includes an epoxy resin, an amine-based curing agent, a polyamide particle, and an epoxy resin-soluble thermoplastic resin, and
at least one of the epoxy resin, the amine-based curing agent, and the epoxy resin-soluble thermoplastic resin partially permeates into the polyamide particle.

The invention described in the above [2] is the prepreg prepared by impregnating the reinforcing fiber substrate with the epoxy resin composition including at least the epoxy resin, the amine-based curing agent, the polyamide particle, and the epoxy resin-soluble thermoplastic resin. This prepreg is characterized in that at least one of the epoxy resin, the amine-based curing agent, and the epoxy resin-soluble thermoplastic resin partially permeate(s) into the polyamide particle.

[3] The prepreg according to [1] or [2], in which the polyamide particle is a surface modified polyamide particle to which surface an epoxy group is introduced.

The invention described in the above [3] is characterized in that the polyamide particle is a surface modified polyamide particle to which surface an epoxy group is introduced.

[4] A prepreg including:
a reinforcing fiber substrate composed of a reinforcing fiber; and
an epoxy resin composition with which the reinforcing fiber substrate is partially or wholly impregnated, in which
the epoxy resin composition includes an epoxy resin, an amine-based curing agent, and a polyamide particle, and
the polyamide particle is a surface modified polyamide particle to which surface an epoxy group is introduced.

The invention described in the above [4] is the prepreg prepared by impregnating the reinforcing fiber substrate with the epoxy resin composition including at least the epoxy resin, the amine-based curing agent, and the polyamide particle. This prepreg is characterized by the surface modified polyamide particle in which an epoxy group is bonded to the surface of the polyamide particle.

[5] The prepreg according to [4], further including an epoxy resin-soluble thermoplastic resin.

[6] The prepreg according to any one of [1] to [5], in which,
when E is defined by a maximum height of peaks of absorption peaks having a peak top in a wavenumber range of 1300±50 cm$^{-1}$ (with a baseline in a wavenumber range from 2150 to 1950 cm$^{-1}$), and A is defined by the maximum height of peaks of absorption peaks having a peak top in a wavenumber range of 3300±50 cm$^{-1}$ (with a baseline in a wavenumber range from 3480 to 3150 cm$^{-1}$), the absorption peaks being measured by an infrared absorption spectrum method, the following Formula (1) is satisfied in a surface layer portion of the polyamide particle.

$$0.15 \leq \text{integration value of } E/A \quad \text{Formula (1)}$$

In the invention described in the above [6], the area intensity ratio of the IR spectrum in the surface layer portion (definition of the surface layer portion will be described below) of the polyamide particle has a predetermined relation. That is, the degree of permeation of at least one of the epoxy resin, the amine-based curing agent, and the epoxy resin-soluble thermoplastic resin into the polyamide particle is defined.

[7] The prepreg according to any one of [1] to [6], in which,
when E is defined by the maximum height of peaks of absorption peaks having a peak top in a wavenumber range of 1300±50 cm$^{-1}$ (with a baseline in a wavenumber range from 2150 to 1950 cm$^{-1}$), and A is defined by the maximum height of peaks of absorption peaks having a peak top in a wavenumber range of 3300±50 cm$^{-1}$ (with a baseline in a wavenumber range from 3480 to 3150 cm$^{-1}$), the absorption peaks being measured by the infrared absorption spectrum method, the following Formula (2) is satisfied in a central portion of the polyamide particle.

$$\text{Integration value of } E/A \leq 0.3 \quad \text{Formula (2)}$$

In the invention described in the above [7], the area intensity ratio of the IR spectrum in the central portion (definition of the central portion will be described below) of the polyamide particle has a predetermined relation. That is, the degree of permeation of at least one of the epoxy resin, the amine-based curing agent, and the epoxy resin-soluble thermoplastic resin into the polyamide particle is defined. In other words, the degree of permeation differs in the surface layer portion and the central portion.

[8] The prepreg according to any one of [1] to [7], in which a crystallinity of the polyamide particle measured by a wide-angle X-ray diffraction method is 42% or less.

[9] The prepreg according to [8], in which the crystallinity is 25% to 42%.

In the invention described in the above [8] and [9], the crystallinity of the polyamide particle is within a predetermined range. The polyamide particle having the crystallinity within this range has high interfacial adhesion to the epoxy resin and is highly functional as an interlaminar particle.

[10] The prepreg according to any one of [1] to [9], in which the epoxy resin-soluble thermoplastic resin is polyethersulfone.

[11] The prepreg according to any one of [1] to [10], in which the polyamide particle is a polyamide particle that is subjected to an epoxy induction treatment in advance; and an epoxy introduction ratio of the polyamide particle surface measured by a time-of-flight secondary ion mass spectrometry measurement is great than 0.

[12] The prepreg according to any one of [1] to [11], in which aerated bulk density (D1), and apparent density (D2) obtained by a dry density measurement using a fixed volume expansion method, of the polyamide particle satisfy the following Formula (3).

$$D1/D2 \geq 0.30 \quad \text{Formula (3)}$$

[13] A method for producing the prepreg according to any one of [1] to [12], in which the epoxy resin and the polyamide particle are kneaded at a temperature from 70 to 150° C. for 10 minutes or more to produce the epoxy resin composition, and then the reinforcing fiber substrate is impregnated with the epoxy resin composition.

[14] A method for producing the prepreg according to any one of [1] to [12], in which
the surface modified polyamide particle and the epoxy resin are kneaded to produce the epoxy resin composition, and then the reinforcing fiber substrate is impregnated with the epoxy resin composition.

The invention described in the above [13] and [14] is a method for producing the prepreg according to any one of [1] to [12].

[15] A method for producing a fiber-reinforced composite material, in which the prepreg according to any one of [1] to [11] are laminated and heated at a pressure from 0.1 to 2 MPa and a temperature from 150 to 210° C. for from 1 to 8 hours.

The invention described in the above [15] is the method for producing the fiber-reinforced composite material having high mode I interlaminar toughness (GIc) by using the prepreg described in [1] to [11].

Advantageous Effects of Invention

The prepreg of one embodiment of the present invention, in which the polyamide particle functioning as the interlaminar particle has the predetermined surface state, has the high interfacial adhesion between the epoxy resin and the polyamide particle. This makes it possible to improve the mode I interlaminar toughness (GIc) of the fiber-reinforced composite material to be obtained and stabilize the quality thereof.

The prepreg of one embodiment of the present invention uses, as the polyamide particle functioning as the interlaminar particle, the surface modified polyamide particle to which surface an epoxy group is introduced. This makes it possible to uniformly control the interfacial adhesion between the epoxy resin and the surface modified polyamide particle. As a result, the mode I interlaminar toughness (GIc) of the fiber-reinforced composite material to be obtained can be improved and the quality thereof can be stabilized.

In the prepreg production method of one embodiment of the present invention, the polyamide particle functioning as the interlaminar particle is subjected to the heat treatment under the predetermined conditions. This makes it possible to uniformly control the interfacial adhesion between the epoxy resin and the polyamide particle. As a result, the mode I interlaminar toughness (GIc) of the fiber-reinforced composite material to be obtained can be improved and the quality thereof can be stabilized.

DESCRIPTION OF EMBODIMENTS

Hereinafter, the prepreg of the present invention, the method for producing the prepreg, and the method for producing the fiber-reinforced composite material using the prepreg of the present invention will be described in detail.

1. Prepreg

A prepreg of the present invention includes a reinforcing fiber substrate and an epoxy resin composition with which the reinforcing fiber substrate is impregnated. The epoxy resin composition used in the present invention includes at least an epoxy resin and an amine-based curing agent, and further includes a polyamide particle having a predetermined surface state. The epoxy resin composition used in the present invention may include a thermoplastic resin and other additives in addition to these.

The prepreg of the present invention is a prepreg in which the reinforcing fiber substrate is partially or wholly impregnated with the epoxy resin composition described above. The content of the epoxy resin composition in the total prepreg is preferably from 15 to 60% by mass on the basis of the total mass of the prepreg. When the resin content is less than 15% by mass, there is a case where a void or the like occurs in the obtained fiber-reinforced composite material and its mechanical properties are reduced. When the resin content is greater than 60% by mass, there is a case where the reinforcing effect by the reinforcing fiber becomes insufficient and there is a substantial reduction in the mechanical properties relative to the mass. The resin content is preferably from 20 to 55% by mass, more preferably from 25 to 50% by mass.

(1-1) Reinforcing Fiber Substrate

The reinforcing fiber substrate used in the present invention is not particularly limited, and examples thereof include a carbon fiber, a glass fiber, an aramid fiber, a silicon carbide fiber, a polyester fiber, a ceramic fiber, an alumina fiber, a boron fiber, a metal fiber, a mineral fiber, an ore fiber, and a slag fiber.

Of these reinforcing fibers, a carbon fiber, a glass fiber, and an aramid fiber are preferable. A carbon fiber is more preferable from the standpoint of obtaining the fiber-reinforced composite material which is excellent in specific strength and specific elastic modulus and has a light weight and high strength. A polyacrylonitrile (PAN)-based carbon fiber is particularly preferable as it has excellent tensile strength.

In a case of using the PAN-based carbon fiber as the reinforcing fiber, its tensile modulus is preferably from 100 to 600 GPa, more preferably from 200 to 500 GPa, particularly preferably from 230 to 450 GPa. Further, the tensile strength is preferably from 2000 to 10000 MPa, more preferably from 3000 to 8000 MPa. The diameter of the carbon fiber is preferably from 4 to 20 μm, more preferably from 5 to 10 μm. Using such a carbon fiber can improve the mechanical properties of the obtained fiber-reinforced composite material.

As the reinforcing fiber, a reinforcing fiber sheet formed into a sheet shape is preferably used. Examples of the reinforcing fiber sheet include a sheet prepared by arranging a large number of reinforcing fibers in one direction, bi-directional woven fabric such as plain weave or twill weave, multi-axial woven fabric, non-woven fabric, a mat, knitted fabric, a braid, and a paper obtained by subjecting a reinforcing fiber to papermaking. Of these, it is preferable to use the unidirectionally arranged sheet, the bi-directional woven fabric, and the multi-axial woven fabric substrate, in which the reinforcing fiber is formed into a sheet shape as a continuous fiber, for obtaining the fiber-reinforced composite material more excellent in the mechanical properties. The thickness of the reinforcing fiber sheet is preferably from 0.01 to 3 mm, more preferably from 0.1 to 1.5 mm.

(1-2) Epoxy Resin

As the epoxy resin, a conventionally known epoxy resin can be used. Specifically, the epoxy resins exemplified as follows can be used. Of these, an epoxy resin having an aromatic group is preferable, and an epoxy resin having either a glycidyl amine structure or a glycidyl ether structure is more preferable. Further, an alicyclic epoxy resin can be also suitably used.

Examples of the epoxy resin having a glycidyl amine structure include various isomers of tetraglycidyldiaminodiphenylmethane, N,N,O-triglycidyl-p-aminophenol, N,N,O-triglycidyl-m-aminophenol, N,N,O-triglycidyl-3-methyl-4-aminophenol, and triglycidylaminocresol.

Examples of the epoxy resin having a glycidyl ether structure include a bisphenol A epoxy resin, a bisphenol F epoxy resin, a bisphenol S epoxy resin, a phenol novolac epoxy resin, a cresol novolac epoxy resin, and a resorcinol epoxy resin.

Further, these epoxy resins may have a non-reactive substituent in an aromatic ring structure or the like as needed. Examples of the non-reactive substituent include an alkyl group such as methyl, ethyl, or isopropyl, an aromatic group such as phenyl, an alkoxyl group, an aralkyl group, and a halogen group such as chlorine or bromine.

(1-3) Amine-Based Curing Agent

In the epoxy resin composition used in the present invention, a known amine-based curing agent is used. Examples of the amine-based curing agent include dicyandiamide, various isomers of an aromatic amine-based curing agent, and an aminobenzoic acid ester. Examples of the aromatic amine-based curing agent include an aromatic diamine compound.

Dicyandiamide is excellent in storage stability of the prepreg and thus preferable. Further, the aromatic diamine compound such as 4,4'-diaminodiphenylsulfone, 3,3'-diaminodiphenylsulfone, or 4,4'-diaminodiphenylmethane, and a derivative thereof having a non-reactive substituent are particularly preferable from the standpoint of providing excellent heat resistance to a cured product. Here, examples of the non-reactive substituent include an alkyl group such as methyl, ethyl, or isopropyl, an aromatic group such as phenyl, an alkoxyl group, an aralkyl group, and a halogen group such as chlorine or bromine.

As the aminobenzoic acid ester, trimethylene glycol di-p-aminobenzoate and neopentyl glycol di-p-aminobenzoate are preferably used. While the composite material obtained by curing using these substances is inferior in heat resistance as compared with a case where various isomers of diaminodiphenylsulfone are used, it is excellent in tensile elongation. Thus, the kind of the curing agent to be used is appropriately selected in accordance with an application of the composite material.

The amount of the curing agent included in the epoxy resin composition is at least an appropriate amount for curing the epoxy resin blended in the epoxy resin composition. The amount of the curing agent only needs to be appropriately adjusted in accordance with the kinds of the epoxy resin and the curing agent to be used. The amount of the curing agent is appropriately adjusted in consideration of the presence/absence and the addition amount of other curing agents and a curing accelerator, stoichiometry with the epoxy resin, the curing rate of the composition, and the like. The curing agent is blended in an amount of preferably from 30 to 100 parts by mass, more preferably from 30 to 70 parts by mass, with respect to 100 parts by mass of the epoxy resin included in the prepreg.

(1-4) Polyamide Particle

The epoxy resin composition used in the present invention includes a predetermined polyamide particle.

In the fiber-reinforced composite material produced by laminating a plurality of the prepregs, the polyamide particles are in a state of being dispersed between the reinforcing fiber substrates adjacent to each other (hereinafter, such dispersed particles are also referred to as "interlaminar particles"). This interlaminar particle improves toughness of the fiber-reinforced composite material.

At least one of the epoxy resin, the amine-based curing agent, and the epoxy resin-soluble thermoplastic resin partially permeates into the surface of this polyamide particle. That is, the surface layer portion of this polyamide particle has a state of having high affinity to the epoxy resin. Thus, the obtained fiber-reinforced composite material has high interfacial adhesion between the polyamide particle and the epoxy resin. As a result, the mode I interlaminar toughness (GIc) of the obtained fiber-reinforced composite material can be improved.

In order for at least one of the epoxy resin, the amine-based curing agent, and the epoxy resin-soluble thermoplastic resin to permeate into the polyamide particle, the polyamide particle is preferably kneaded with at least one of the epoxy resin, the amine-based curing agent, and the epoxy resin-soluble thermoplastic resin at a temperature from 70 to 150° C. for 10 minutes or more. The epoxy resin or the like permeates between and/or within the molecules of the polyamide, and/or into a void space in the polyamide particle, by kneading under the heating condition for a long time. The kneading temperature is more preferably from 90 to 140° C., particularly preferably from 115 to 130° C. The kneading time is more preferably from 20 to 300 minutes, particularly preferably from 30 to 150 minutes.

In the present invention, regarding the polyamide particle, adhesion between the surface layer portion of the polyamide particle and the epoxy resin can be improved by a method of performing the heat treatment and/or a method of using the surface modified polyamide particle described below. As a result, impact resistance of the composite material produced by using the prepreg of the present invention can be improved. Regarding the polyamide particle, it is more preferable to use both the method of performing the heat treatment and the method of using the surface modified polyamide particle described below.

Further, it is preferable that, in the prepreg of the present invention, the area intensity ratio of the IR spectrum (hereinafter also referred to as an "IR intensity ratio") in the surface layer portion of the polyamide particle has a predetermined relation. Specifically, when E is defined by the maximum height of peaks area of absorption peaks having a peak top in a wavenumber range of $1300\pm50$ cm$^{-1}$ (with a baseline in a wavenumber range from 2150 to 1950 cm$^{-1}$), and A is defined by the maximum height of peaks of absorption peaks having a peak top in a wavenumber range of $3300\pm50$ cm$^{-1}$ (with a baseline in a wavenumber range from 3480 to 3150 cm$^{-1}$), the absorption peaks being measured by an infrared absorption spectrum method, the following Formula (1) is preferably satisfied.

$$0.15 \leq \text{integration value of } E/A \qquad \text{Formula (1)}$$

Note that peaks having a peak top in a wavenumber range of $1300\pm50$ cm$^{-1}$ are peaks derived from the epoxy resin, the amine-based curing agent, and the epoxy resin-soluble thermoplastic resin. Further, peaks having a peak top in a wavenumber range of $3300\pm50$ cm$^{-1}$ are peaks derived from the polyamide.

The term "surface layer portion" described herein refers to a portion having a depth of up to 30% of the radius of the polyamide particle from the outside (outer peripheral portion) of the polyamide particle toward the center thereof. Further, in the present invention, the term "central portion" of the polyamide particle refers to a portion in a range of 30% of the radius of the polyamide particle from the center of the polyamide particle toward the outside (outer peripheral portion) thereof. That is, in a case of the polyamide particle having a radius of 10 μm, the surface layer portion refers to a portion at a depth up to 3 μm from the outer periphery of the polyamide particle toward the center thereof, while the central portion refers to a portion within a range of 3 μm from the center of the polyamide particle toward the outer peripheral portion thereof, that is, a portion of the particle central portion having a diameter of 6 μm. In a case where the polyamide particle has an elliptical shape, the center is the intersection point of the major axis and the minor axis and the distance from the center to a point on the circumference of the ellipse is not constant. In such a case, the surface layer portion and the central portion refer to outer and inner potions of 30% of the distance between the center and the point on the circumference of the ellipse. Similarly, in a case of other shapes, the surface layer portion and the central portion refer to outer and inner potions of 30% of the distance between the center and the point on the outer circumference.

When the minimum value of the IR intensity ratio (E/A) in the surface layer portion of the polyamide particle is less than 0.15, the affinity to the epoxy resin is low. This reduces the interfacial adhesion between the epoxy resin and the polyamide particle in the obtained fiber-reinforced composite material. The minimum value of the IR intensity ratio (E/A) in the surface layer portion of the polyamide particle is preferably 0.15 or more, more preferably in a rage from 0.2 to 3.0, further more preferably in a rage from 0.3 to 2.0. Further, the mean value of the IR intensity ratio (E/A) in the surface layer portion of the polyamide particle is preferably 0.15 or more, more preferably 0.2 or more, further more preferably from 0.25 to 3.0.

The IR intensity ratio (integration value of E/A) in the surface layer portion of the polyamide particle can be increased as the temperature is made higher and/or the time is made longer for heating and kneading the polyamide particle, the epoxy resin, and the like. Further, it can also be adjusted by adjusting the crystallinity of the polyamide particle.

It is preferable that, in the prepreg of the present invention, the IR intensity ratio in the central portion of the polyamide particle has a predetermined relation. Specifically, when E is defined by the maximum height of peaks of absorption peaks having a peak top in a wavenumber range of $1300\pm50$ cm$^{-1}$ (with a baseline in a wavenumber range from 2150 to 1950 cm$^{-1}$), and A is defined by an integration value of a peak area of absorption peaks having a peak top in a wavenumber range of $3300\pm50$ cm$^{-1}$ (with a baseline in a wavenumber range from 3480 to 3150 cm$^{-1}$), the absorption peaks being measured by an infrared absorption spectrum method, the following Formula (2) is preferably satisfied.

Integration value of $E/A \leq 0.3$   Formula (2)

That is, in the polyamide particle blended in the prepreg of the present invention, the state of the surface layer portion and the state of the central portion are preferably different from each other. Specifically, it is crucial that at least one of the epoxy resin, the amine-based curing agent, and the epoxy resin-soluble thermoplastic resin partially permeates into the surface layer portion of the polyamide particle, while it is preferable that they hardly permeate into the central portion of the polyamide particle. This makes it possible to improve the interfacial adhesion between the epoxy resin and the polyamide particle while allowing the polyamide particle to exhibit a function as the interlaminar particle.

When the integral value of the IR intensity ratio (E/A) in the central portion of the polyamide particle is 0.3 or less, the mode I interlaminar toughness (GIc) of the obtained fiber-reinforced composite material can be further improved. The integral value of the IR intensity ratio (E/A) in the central portion of the polyamide particle is more preferably in a range from 0 to 0.20, further more preferably in a range from 0 to 0.15.

The integral value of the IR intensity ratio (E/A) in the central portion of the polyamide particle can be reduced by performing a homogenization treatment to the polyamide particle in advance. As a method of the homogenization treatment, a method for performing a heat treatment to the polyamide particle or the like can be mentioned. Performing the homogenization treatment can reduce a void space in the surface layer and/or the inside of the polyamide particle, thus excessive permeation of the epoxy resin or the like can be prevented.

As an index showing the presence/absence and the quantity of the void space in the surface layer and/or the inside of the particle such as the polyamide particle, various indexes are known. Examples thereof include specific surface area, aerated bulk density, packed bulk density, apparent density, true density, porosity, void, and void fraction. Of these, the aerated bulk density is density of particles when the internal volume obtained by filling a container of a fixed volume with particles by free fall is used as the volume, and the volume includes void spaces in the surface layer and the inside of the particle. Further, the apparent density and the true density can be measured by any method such as a pycnometer method, a water immersion method, a mercury intrusion method, or a fixed volume expansion method. Of these, the fixed volume expansion method is preferably used as it is a dry measurement using gas and thus eliminates the necessity of taking into consideration effects of dissolution and wettability caused in a wet measurement, thereby allowing a high-precision measurement. The true density is density calculated by excluding a void space accessible to the outside of the particle (open fine pore) and a void space not accessible to the outside of the particle (closed fine pore) from the particle volume. In contrast, the apparent density is density calculated by excluding the open fine pore from the volume but including the closed fine pore in the volume. Note that, in the fixed volume expansion method, the gas is unable to reach the inner space (closed fine pore) closed to the outside of the particle, thus the value measured in this method represents apparent density.

In the polyamide particle of the present invention, the aerated bulk density (D1) of the polyamide particle and the apparent density (D2) obtained by the dry density measurement using the fixed volume expansion method preferably satisfy the following Formula (3).

$D1/D2 \geq 0.30$   Formula (3)

The greater the ratio (D1/D2) of the aerated bulk density and the apparent density is, the less the void spaces exist in the surface layer and/or the inside of the polyamide particle, indicating uniform distribution of the particle shape. Thus, the ratio (D1/D2) of the aerated bulk density and the apparent density of 0.30 or more is preferable as moldability of the obtained prepreg and toughness and quality stability of the fiber-reinforced composite material tend to improve. The ratio (D1/D2) of the aerated bulk density and the apparent density is more preferably 0.35 or more.

When the homogenization treatment is performed by the heat treatment, the heat treatment is performed preferably in fluid such as liquid or gas, more preferably in gas. Performing the heat treatment in the fluid allows the whole polyamide particle to be uniformly subjected to the heat treated.

When the heat treatment is performed in the gas, there is no particular limitation to the gas to be used, and example of the usable gas include oxidizing gas such as the air, oxygen, ozone, and nitrogen dioxide; reducing gas such as carbon monoxide and nitrogen monoxide; and inert gas such as nitrogen, helium, or argon. The heat treatment temperature is appropriately adjusted in accordance with the kind of the polyamide particle to be used. Specifically, the temperature is preferably equal to or higher than the melting point of the polyamide particle, more preferably from 100 to 800° C., further more preferably from 250 to 600° C.

As a heat treatment method, the polyamide particle is preferably dispersed by spraying in the fluid heated to the treatment temperature. Dispersing the polyamide particle by spraying in the fluid allows the whole polyamide particle to be uniformly subjected to the heat treated. When the polyamide particle is dispersed by spraying in the fluid, the flow rate of the fluid (airflow rate in case of gas) is preferably from 0.1 to 10 $m^3$/min, more preferably from 0.5 to 5 $m^3$/min. Further, the supply amount of the polyamide particle to be dispersed by spraying is preferably from 1 to 100 g/min per 1 $m^3$ of the fluid.

Examples of the polyamide particle include a polyamide particle formed from a crystalline polyamide such as nylon 6 (registered trademark) (PA6, polyamide obtained by ring-opening polymerization reaction of ε-caprolactam), nylon 12 (PA12, polyamide obtained by ring-opening polymerization reaction of lauryl lactam or polycondensation reaction of 12-aminododecanoic acid), nylon 1010 (PA1010, polyamide obtained by polycondensation reaction of sebacic acid and decamethylenediamine), or nylon 11 (PA11, polyamide obtained by ring-opening polymerization reaction of undecane lactam or polycondensation reaction of 11-aminoundecanoic acid), and a polyamide particle formed from, for example, amorphous nylon (also called transparent nylon, in which crystallization of polymer does not occur, or crystallization rate of polymer is extremely low). The crystalline polyamide is more preferable from the standpoints of impact resistance and toughness of the obtained composite material and ease of adjusting permeability of the epoxy resin or the curing agent.

The content of the polyamide particle in the epoxy resin composition is appropriately adjusted in accordance with the viscosity of the epoxy resin composition. The content is preferably from 1 to 50 parts by mass, more preferably from 2 to 45 parts by mass, further more preferably from 5 to 40 parts by mass, with respect to 100 parts by mass of the epoxy resin included in the epoxy resin composition from the standpoint of processability of the prepreg. When the content is less than 1 part by mass, the impact resistance of the obtained fiber-reinforced composite material becomes insufficient in some cases. When the content is more than 50 parts by mass, impregnation of the reinforcing fiber substrate with the epoxy resin composition, drape properties of the obtained prepreg, or the like reduces in some cases.

The crystallinity of the polyamide particle measured by an X-ray diffraction method is preferably less than 43%, more preferably 42% or less, from the standpoint of physical properties or the like of the obtained composite material. The lower limit of the crystallinity is not limited. However, it is preferably 25% or more.

Further, the interfacial adhesion can be improved by a chemical treatment in which a functional group having high affinity to epoxy is introduced to the polyamide particle. Specific examples thereof include a method of performing an epoxidation treatment.

Specifically, as the polyamide particle, a surface modified polyamide particle to which surface an epoxy group is introduced is preferably used. Such a surface modified polyamide particle can be obtained by reacting a compound capable of introducing an epoxy group to the particle surface through a reaction with the polyamide, and the polyamide particle, and introducing the epoxy group (epoxidizing) to the polyamide particle surface. This surface modified polyamide particle has the excellent interfacial adhesion to the epoxy resin serving as a matrix resin.

The compound capable of introducing an epoxy group to the particle surface through a reaction with the polyamide is not partially limited. However, examples thereof include a compound having an epihalohydrin skeleton such as epichlorohydrin, 2-(chloromethyl)-1,2-epoxypropane, 1-chloro-2,3-epoxybutane, epibromohydrin, or epiiodohydrin, and a multifunctional epoxy compound. As the multifunctional epoxy compound, a conventionally known epoxy resin can be used. Specific examples thereof include an aromatic epoxy resin having a glycidyl ether structure such as a bisphenol A epoxy resin, a bisphenol F epoxy resin, a bisphenol S epoxy resin, a phenol novolac epoxy resin, a cresol novolac epoxy resin, or a resorcinol epoxy resin; and an aromatic epoxy resin having a glycidyl amine structure such as various isomers of tetraglycidyldiaminodiphenylmethane, N,N,O-triglycidyl-p-aminophenol, N,N,O-triglycidyl-m-aminophenol, N,N,O-triglycidyl-3-methyl-4-aminophenol, or triglycidylaminocresol. Further, an aliphatic epoxy resin or an alicyclic epoxy resin derived from, for example, an aliphatic polyol such as ethylene glycol or glycerol, a polyether polyol such as polyethylene glycol or polypropylene glycol, or a sugar alcohol such as sorbitol can be preferably used.

The surface modified polyamide particle to which surface an epoxy group is introduced described herein can be produced, for example, by the following method.

First, the polyamide particle to which surface an epoxy group is not introduced and epichlorohydrin are reacted in water using tetramethylammonium chloride and water as a catalyst at 80° C. for 48 hours to obtain a chlorohydrin product in which the surface of the polyamide particle is modified by the chlorohydrin. Next, this chlorohydrin product is subjected to a ring forming reaction in an aqueous sodium hydroxide solution to cause epoxidation, so that an epoxy group is introduced to the surface of the polyamide particle.

The epoxy introduction ratio of the polyamide particle is preferably more than 0, more preferably 0.1 or more, further more preferably 0.5 or more, particularly preferably 1.0 or more. The epoxy introduction ratio described herein refers to a quantitative ratio of the epoxy groups introduced to the polyamide particle surface with respect to the polyamides in the portions to which the epoxy groups are not introduced. In the present invention, the epoxy introduction ratio means a value measured by time-of-flight secondary ion mass spectrometry (ToF-SIMS) described in Example below.

Using such a surface modified polyamide particle is preferable as it can reduce the coefficient of variation (CV) of values of GIc of the composite material to be obtained as a final product. Further, it is also preferable because the values of GIc hardly vary even when the temperature raising rate during curing at the time of producing the fiber-reinforced composite material is changed.

The form of the polyamide particle is not particularly limited. However, it is preferably a spherical shape, more preferably a spherical shape having a sphericity of 80% or more. The spherical polyamide particle can be uniformly blended in the resin composition. Further, the obtained prepreg has high moldability. A method for obtaining such a polyamide particle is not particularly limited. However, examples thereof include a method in which a polyamide solution in which a polyamide is dissolved in a solvent is deposited in a poor solvent by adjusting the concentration of the solution or the solvent and a method in which a non-spherical polyamide particle is subjected to a heat treatment.

Further, the polyamide particle is preferably subjected to the homogenization treatment such as the heat treatment in advance. Performing the homogenization treatment can confine the integral value of the IR intensity ratio (E/A) in the central portion of the polyamide particle within a desired range as described above. Further, homogenizing the shape or structure of the polyamide particle can improve toughness and quality stability of the obtained fiber-reinforced composite material.

The average particle diameter of the polyamide particle is preferably from 1 to 50 μm, particularly preferably from 3 to 30 μm, further preferably from 10 to 30 μm. When it is less than 1 μm, the viscosity of the epoxy resin composition significantly increases. This sometimes makes it difficult to add a sufficient amount of the polyamide particle to the epoxy resin composition. When it is more than 50 μm, during processing of the epoxy resin composition into a sheet shape, it is sometimes difficult to obtain a sheet having a uniform thickness.

(1-5) Thermoplastic Resin

The prepreg of the present invention may include a thermoplastic resin in addition to the above polyamide particle. As the thermoplastic resin, an epoxy resin-soluble thermoplastic resin and an epoxy resin-insoluble thermoplastic resin can be mentioned.

(1-5-1) Epoxy Resin-Soluble Thermoplastic Resin

The epoxy resin composition can include an epoxy resin-soluble thermoplastic resin. This epoxy resin-soluble thermoplastic resin can adjust the viscosity of the epoxy resin composition and also improve the impact resistance of the obtained fiber-reinforced composite material.

The epoxy resin-soluble thermoplastic resin refers to a thermoplastic resin which can be partially or entirely dissolved in an epoxy resin at a temperature equal to or lower than the molding temperature of the fiber-reinforced composite material. In this description, the phrase "partly dissolved in epoxy resin" means that, when 10 parts by mass of the thermoplastic resin having an average particle diameter from 10 to 50 μm is mixed to 100 parts by mass of the epoxy resin and stirred at 190° C. for 1 hour, the particles disappear or the size of the particles changes by 10% or more.

On the other hand, the epoxy resin-insoluble thermoplastic resin means a thermoplastic resin which is not substantially dissolved in the epoxy resin at a temperature equal to or lower than the molding temperature of the fiber-reinforced composite material. That is, the epoxy resin-insoluble thermoplastic resin means a thermoplastic resin of which the particle size does not change by 10% or more when 10 parts by mass of the thermoplastic resin having an average particle diameter from 10 to 50 μm is mixed to 100 parts by mass of the epoxy resin and stirred at 190° C. for 1 hour. Note that the molding temperature of the fiber-reinforced composite material is generally from 100 to 190° C. Further, the particle diameter is visually measured using a microscope, and the average particle diameter means an average value of the particle diameters of 100 randomly selected particles.

When the epoxy resin-soluble thermoplastic resin is not completely dissolved, it is heated during the curing process of the epoxy resin to be dissolved in the epoxy resin, so that the viscosity of the epoxy resin composition can be increased. This makes it possible to prevent outflow of the epoxy resin composition (a phenomenon in which the resin composition flows out of the prepreg) due to a decrease in the viscosity during the curing process.

The epoxy resin-soluble thermoplastic resin is preferably a resin which can be dissolved in the epoxy resin by 80% by mass or more at 190° C.

Specific examples of the epoxy resin-soluble thermoplastic resin include polyethersulfone, polysulfone, polyetherimide, and polycarbonate. These may be used alone, or two or more kinds may be used in combination. As the epoxy resin-soluble thermoplastic resin included in the epoxy resin composition, polyethersulfone and polysulfone, having the weight average molecular weight (Mw) in a range from 8000 to 60000, are particularly preferable. When the weight average molecular weight (Mw) is smaller than 8000, there is a case where the impact resistance of the obtained fiber-reinforced composite material becomes insufficient, and when the Mw is more than 60000, there is a case where the viscosity significantly increases and handling properties are significantly deteriorated. The molecular weight distribution of the epoxy resin-soluble thermoplastic resin is preferably uniform. In particular, the polydispersity (Mw/Mn) that is a ratio of the weight average molecular weight (Mw) and the number average molecular weight (Mn) is preferably within a range from 1 to 10, more preferably within a range from 1.1 to 5. Note that, in the present invention, the weight average molecular weight means the molecular weight measured by gel permeation chromatography.

The epoxy resin-soluble thermoplastic resin preferably has a reactive group having a reactivity with an epoxy resin or a functional group which forms a hydrogen bond with an epoxy resin. Such an epoxy resin-soluble thermoplastic resin can improve the dissolution stability of the epoxy resin during the curing process. Further, toughness, chemical resistance, heat resistance, and moist heat resistance can be imparted to the fiber-reinforced composite material obtained after curing.

As the reactive group having a reactivity with an epoxy resin, a hydroxyl group, a carboxylic acid group, an imino group, an amino group, and the like are preferable. Using hydroxyl group-terminated polyethersulfone is more preferable as the obtained fiber-reinforced composite material exhibits particularly excellent impact resistance, fracture toughness, and solvent resistance.

The content of the epoxy resin-soluble thermoplastic resin included in the epoxy resin composition is appropriately adjusted in accordance with the viscosity. From the standpoint of the processability of the prepreg, the content is preferably from 5 to 90 parts by mass, more preferably from 5 to 40 parts by mass, and further more preferably from 15 to 35 parts by mass, with respect to 100 parts by mass of the epoxy resin included in the epoxy resin composition. When the content is less than 5 parts by mass, there is a case where impact resistance of the obtained fiber-reinforced composite material becomes insufficient. When the content of the epoxy resin-soluble thermoplastic resin becomes high, there is a case where the viscosity significantly increases and handling properties of the prepreg are significantly deteriorated.

The epoxy resin-soluble thermoplastic resin preferably includes a reactive aromatic oligomer having an amine terminal group (hereinafter also simply referred to as an "aromatic oligomer").

The molecular weight of the epoxy resin composition is increased by a curing reaction of the epoxy resin and the curing agent at the time of heat curing. The increase in the molecular weight causes the expansion of a two-phase region. As a result, the aromatic oligomer dissolved in the epoxy resin composition undergoes a reaction-inducing phase separation. Due to this phase separation, a two-phase structure of resin in which the epoxy resin after curing and the aromatic oligomer are co-continuous is formed in a matrix resin. Further, the aromatic oligomer having an amine terminal group also causes a reaction with the epoxy resin. Each phase in this co-continuous two-phase structure is strongly bonded to each other, thus, the solvent resistance is also improved.

This co-continuous structure absorbs the impact on the fiber-reinforced composite material from the outside and thereby suppresses crack propagation. As a result, the fiber-reinforced composite material produced by using the prepreg that include the aromatic oligomer has the high impact resistance and fracture toughness.

As the aromatic oligomer, known polysulfone having an amine terminal group or known polyethersulfone having an amine terminal group can be used. The amine terminal group is preferably a primary amine ($-NH_2$) terminal group.

The aromatic oligomer blended in the epoxy resin composition preferably has the weight average molecular weight measured by gel permeation chromatography from 8000 to 40000. When the weight average molecular weight is less than 8000, the toughness improving effect of the matrix resin is low. Further, when the weight average molecular weight is more than 40000, the viscosity of the epoxy resin composition becomes extremely high, it is likely to cause a problem in the processing such as a difficulty in performing impregnation of the reinforcing fiber layer with the epoxy resin composition.

As the aromatic oligomer, a commercially available product such as "Virantage DAMS VW-30500 RP (registered trademark, manufactured by Solvay Specialty Polymers) can preferably be used.

The form of the epoxy resin-soluble thermoplastic resin is not particularly limited. However, it preferably has a particulate shape. The epoxy resin-soluble thermoplastic resin having a particulate shape can be uniformly blended in the epoxy resin composition. Further, the obtained prepreg has high moldability.

The average particle diameter of the epoxy resin-soluble thermoplastic resin is preferably from 1 to 50 μm, particularly preferably from 3 to 30 μm. When it is less than 1 μm, the viscosity of the epoxy resin composition significantly increases. This sometimes makes it difficult to add a sufficient amount of the epoxy resin-soluble thermoplastic resin to the epoxy resin composition. When it is more than 50 μm, during processing of the epoxy resin composition into a sheet shape, it is sometimes difficult to obtain a sheet having a uniform thickness. Further, the dissolution rate to the epoxy resin becomes low and the obtained fiber-reinforced composite material becomes uneven, thus this case is not preferable.

(1-5-2) Epoxy Resin-Insoluble Thermoplastic Resin

In the epoxy resin composition, an epoxy resin-insoluble thermoplastic resin may be included other than the epoxy resin-soluble thermoplastic resin. In the present invention, the epoxy resin composition preferably includes both the epoxy resin-soluble thermoplastic resin and the epoxy resin-insoluble thermoplastic resin.

The epoxy resin-insoluble thermoplastic resin or a part of epoxy resin-soluble thermoplastic resin (the epoxy resin-soluble thermoplastic resin remained without being dissolved in the matrix resin after curing) is turned into a state in which the particles thereof are dispersed in the matrix resin of the fiber-reinforced composite material (hereinafter, these dispersed particles are also referred to as "interlaminar particles"). The interlaminar particles suppress propagation of the impact given to the fiber-reinforced composite material. As a result, the impact resistance of the fiber-reinforced composite material is improved.

Examples of the epoxy resin-insoluble thermoplastic resin include polyamide, polyacetal, polyphenylene oxide, polyphenylene sulfide, polyester, polyamideimide, polyimide, polyether ketone, polyether ether ketone, polyethylene naphthalate, polyether nitrile, and polybenzimidazole. Of these, polyamide, polyamideimide, and polyimide have high toughness and heat resistance and are thus preferable. Polyamide and polyimide are particularly excellent in the toughness improving effect of the fiber-reinforced composite material. These may be used alone, or two or more kinds may be used in combination. Further, a copolymer of these compounds can also be used.

In particular, by using the polyamide particle formed from an amorphous polyimide or a crystalline polyimide such as nylon 6 (registered trademark), nylon 12, nylon 1010, or nylon 11; and the polyamide particle formed from, for example, amorphous nylon, heat resistance of the obtained fiber-reinforced composite material can particularly be improved.

The content of the epoxy resin-insoluble thermoplastic resin in the epoxy resin composition is appropriately adjusted in accordance with the viscosity of the epoxy resin composition. The content is preferably from 5 to 50 parts by mass, more preferably from 10 to 45 parts by mass, further more preferably from 15 to 40 parts by mass, with respect to 100 parts by mass of the epoxy resin included in the epoxy resin composition from the standpoint of processability of the prepreg. When the content is less than 5 parts by mass, the impact resistance of the obtained fiber-reinforced composite material becomes insufficient in some cases. When the content is more than 50 parts by mass, impregnation of the epoxy resin composition, drape properties of the obtained prepreg, or the like reduces in some cases.

The preferable average particle diameter and form of the epoxy resin-insoluble thermoplastic resin are the same as those of the epoxy resin-soluble thermoplastic resin.

(1-6) Other Additives

The epoxy resin composition of the present invention may be blended with an electroconductive particle, a flame retardant, an inorganic filler, and an internal mold release agent.

Examples of the electroconductive particle include an electroconductive polymer particle such as a polyacetylene particle, a polyaniline particle, a polypyrrole particle, a polythiophene particle, a polyisothianaphthene particle, or a polyethylenedioxythiophene particle; a carbon particle; a carbon fiber particle; a metal particle; and a particle of which a core material composed of an inorganic material or an organic material is coated with an electroconductive substance.

As the flame retardant, a phosphorus-based flame retardant is exemplified. The phosphorus-based flame retardant is not particularly limited as long as it includes a phosphorus atom in the molecule, and examples thereof include an organic phosphorus compound such as a phosphate ester, a condensed phosphate ester, a phosphazene compound, or a polyphosphate, and red phosphorus.

Examples of the inorganic filler include aluminum borate, calcium carbonate, silicon carbonate, silicon nitride, potassium titanate, basic magnesium sulfate, zinc oxide, graphite, calcium sulfate, magnesium borate, magnesium oxide, and a silicate mineral. A silicate mineral is particularly preferably used. As a commercially available product of the silicate mineral, THIXOTROPIC AGENT DT 5039 (manufactured by Huntsman-Japan KK) can be mentioned.

Examples of the internal mold release agent include a metal soap, plant wax such as polyethylene wax or carnauba wax, a fatty acid ester-based release agent, silicone oil, animal wax, and a fluorine-based nonionic surfactant. The blending amount of these internal mold release agents is preferably from 0.1 to 5 parts by mass, more preferably 0.2 to 2 parts by mass, with respect to 100 parts by mass of the epoxy resin. Within this range, the releasing effect from a mold is suitably exhibited.

Examples of a commercially available product of the internal mold release agent include "MOLD WIZ (registered trademark)" INT 1846 (manufactured by AXEL PLASTICS RESEARCH LABORATORIES Inc.), Licowax S, Licowax P, Licowax O P, Licowax P E 190, Licowax PED (manufactured by Clariant Japan K.K.), and stearyl stearate (SL-900 A; manufactured by Riken Vitamin Co., Ltd.).

The epoxy resin composition used in the present invention has a viscosity at 100° C. of preferably from 1 to 1000 Pas, more preferably from 5 to 500 Pas. When the viscosity is less than 1 Pas, the resin is easily flown out from the prepreg. When the viscosity is more than 1000 Pas, an unimpregnated portion tends to be generated in the prepreg. As a result, a void or the like tends to be formed in the obtained fiber-reinforced composite material.

(1-7) Method for Producing the Epoxy Resin Composition

The epoxy resin composition used in the present invention can be produced by mixing the epoxy resin, the amine-based curing agent, the polyamide particle, and, optionally, the thermoplastic resin and other ingredients. These may be mixed in any order.

In the present invention, it is preferable that the epoxy resin and the polyamide particle are kneaded at a temperature from 70 to 150° C. for 10 minutes or more. Kneading the epoxy resin and the polyamide particle under the heating condition for a prescribed time or more allows the epoxy resin to permeate into the polyamide particle. The epoxy resin or the like permeates into a void space in the polyamide particle by kneading under the heating condition for a long time. The kneading temperature is more preferably from 90 to 140° C., particularly preferably from 115 to 130° C. The kneading time is more preferably from 20 to 300 minutes, particularly preferably from 30 to 150 minutes.

When the epoxy resin and the polyamide particle are kneaded at a temperature from 70 to 150° C. for 10 minutes or more, the amine-based curing agent is preferably added after kneading. On the other hand, in a case where the epoxy resin-soluble thermoplastic resin is added, it is preferably added before kneading.

The mixing temperature after adding the curing agent is preferably from 10 to 150° C., more preferably from 20 to 130° C., further more preferably from 30 to 100° C. When the temperature is higher than 150° C., in some cases, the curing reaction partially proceeds, which causes a reduction in impregnation of the reinforcing fiber substrate layer and a reduction in storage stability of the obtained epoxy resin composition and the prepreg produced by using the epoxy resin composition. When the temperature is lower than 10° C., in some cases, it becomes practically difficult to perform mixing due to high viscosity of the epoxy resin composition.

As a mixing machine, a conventionally known mixing machine can be used. Specific examples thereof include a roll mill, a planetary mixer, a kneader, an extruder, a Banbury mixer, a mixing container equipped with a stirring blade, and a horizontal mixing tank. The mixing of each component can be performed in the atmosphere, in an inert gas atmosphere, or under reduced pressure. When the mixing is performed in the atmosphere, the temperature and humidity of the atmosphere are preferably controlled. Although not particularly limited, for example, it is preferable that the mixing is performed in the atmosphere in which the temperature is controlled at a constant temperature of 30° C. or lower, or in the low humidity atmosphere having a relative humidity of 50% RH or lower.

The polyamide particle is preferably subjected to the heat treatment in advance as needed. The conditions of the heat treatment are as described above.

(1-8) Method for Producing the Prepreg

The method for producing the prepreg of the present invention is not particularly limited, and any conventionally known method can be adopted. Specifically, a hot melt method and a solvent method can be suitably adopted.

The hot melt method is a method in which a resin composition film is formed by applying a resin composition to a release paper in the form of a thin film, and the resin composition film is laminated on the reinforcing fiber substrate and heated under pressure to impregnate the reinforcing fiber substrate layer with the resin composition.

A method of forming the resin composition into the resin composition film is not particularly limited, and any conventionally known method can be used. Specifically, the resin composition film can be obtained by casting the resin composition on a support such as a release paper or a film using a die extruder, an applicator, a reverse roll coater, a comma coater, or the like. The resin temperature at the time of producing the film is appropriately determined in accordance with the composition and the viscosity of the resin composition. Specifically, the same temperature condition as the mixing temperature in the above method for producing the epoxy resin composition is suitably used. Impregnation of the reinforcing fiber substrate layer with the resin composition may be performed once or multiple times.

The solvent method is a method in which the epoxy resin composition is varnished using a suitable solvent, and the reinforcing fiber substrate layer is impregnated with this varnish.

The prepreg of the present invention can be suitably produced by the hot-melt method not using a solvent among these conventional methods.

When the reinforcing fiber substrate layer is impregnated with the epoxy resin composition film by the hot melt method, the impregnation temperature is preferably in a range from 50 to 150° C. When the impregnation temperature is lower than 50° C., in some cases, the reinforcing fiber substrate layer is not sufficiently impregnated with the epoxy resin due to the high viscosity of the epoxy resin. When the impregnation temperature is higher than 150° C., in some cases, the curing reaction of the epoxy resin composition proceeds, thereby causing a reduction in the storage stability and the draping properties of the obtained prepreg. The impregnation temperature is more preferably from 60 to 145° C., particularly preferably from 70 to 140° C.

When the reinforcing fiber substrate layer is impregnated with the epoxy resin composition film by the hot melt method, the impregnation pressure is appropriately determined in consideration of, for example, the viscosity and the resin flow of the epoxy resin composition.

Specific impregnation pressure is preferably from 1 to 50 (kN/cm), more preferably from 2 to 40 (kN/cm).

2. Fiber-Reinforced Composite Material

The fiber-reinforced composite material can be obtained by heating, pressing, and curing the prepreg of the present invention under specific conditions.

The polyamide particle in the fiber-reinforced composite material preferably satisfies the relation of E/A in the above Formula (1). Further, it more preferably satisfies the relation of E/A in the above Formula (2). On the other hand, the crystallinity of the polyamide particle in the prepreg changes after the fiber-reinforced composite material is formed.

Examples of the method for producing the fiber-reinforced composite material using the prepreg of the present invention include a known molding method such as autoclave molding or press molding.

(2-1) Autoclave Molding Method

As the method for producing the fiber-reinforced composite material of the present invention, the autoclave molding method is preferably used. The autoclave molding method is a molding method in which a prepreg and a film bag are sequentially placed on a lower die of a mold, the prepreg is sealed between the lower die and the film bag, and the prepreg is heated and pressed by an autoclave molding apparatus while the space formed by the lower die and the film bag is vacuumed. It is preferable that heating and pressing is performed under molding conditions of a temperature raising rate from 1 to 50° C./min at from 0.2 to 0.7 MPa and from 130 to 180° C. for from 10 to 150 minutes.

(2-2) Press Molding Method

As the method for producing the fiber-reinforced composite material of the present invention, the press molding method is preferably used. The production of the fiber-reinforced composite material by the press molding method is performed by heating and pressing the prepreg of the present invention or a preform formed by laminating the prepreg of the present invention by using a mold. It is preferable that the mold is heated to the curing temperature in advance.

The temperature of the mold during press molding is preferably from 150 to 210° C. When the molding temperature is 150° C. or higher, a curing reaction can be sufficiently caused, and the fiber-reinforced composite material can be obtained with high productivity. Further, when the molding temperature is 210° C. or lower, the resin viscosity is not excessively reduced, and thus excessive flow of the resin in the mold can be reduced. As a result, it becomes possible to reduce the outflow of the resin from the mold and the meandering of the fiber, so that the fiber-reinforced composite material with high quality can be obtained.

The pressure during molding is from 0.2 to 2 MPa. When the pressure is 0.2 MPa or higher, the proper flow of the resin can be obtained, thus the occurrence of an appearance defect and a void can be prevented. Further, the prepreg sufficiently adheres to the mold, allowing the production of the fiber-reinforced composite material having an excellent appearance. When the pressure is 2 MPa or lower, there is no excessive flow of the resin, thus an appearance defect of the obtained fiber-reinforced composite material hardly occurs. Further, no excessive load is applied to the mold, thus the deformation or the like of the mold hardly occurs.

The molding time is preferably from 1 to 8 hours.

The obtained fiber-reinforced composite material has the mode I interlaminar toughness (GIc) of preferably 350 J/m$^2$ or more, more preferably 525 J/m$^2$ or more. When the GIc is lower than 350 J/m$^2$, mechanical properties, such as impact resistance, and durability, required for various applications, may become insufficient, thus this case is not preferable.

EXAMPLES

Hereinafter, the present invention will be described in more detail with reference to Examples, but the present invention is not limited to these Examples. The components and test methods used in the present Examples and Comparative examples are described below.

Components (Epoxy Resin)
  Glycidyl amine type epoxy resin (trifunctional group): Araldite MY0600 (trade name, manufactured by Huntsman Advanced Materials, hereinafter abbreviated as "MY0600")
  Glycidyl amine type epoxy resin (tetrafunctional group): Araldite MY721 (trade name, manufactured by Huntsman Advanced Materials, hereinafter abbreviated as "MY721")
  Glycidyl ether epoxy resin (bifunctional group): Ex-201 (trade name, manufactured by Nagase ChemteX Corp.)

(Amine-Based Curing Agent)
  Aromatic amine-based curing agent: 3,3'-diaminodiphenylsulfone (manufactured by MITSUI FINE CHEMICALS, Inc., hereinafter abbreviated as "3,3'-DDS")

(Polyamide Particle)
  PA12:VESTSINT2158 (trade name, polyamide 12 resin particle having average particle diameter of 20 μm, manufactured by Daicel-Evonik Ltd.)
  PA12(A): ORGASOL 2002D NAT1 (trade name, polyamide 12 resin particle having average particle diameter of 20 μm, manufactured by Arkema)
  PA1010: VESTSINT9158 (trade name, polyamide 1010 resin particle having average particle diameter of 20 μm, manufactured by Daicel-Evonik Ltd.)
  PA11: RILSAN D30NAT (trade name, polyamide 11 resin particle having average particle diameter of 25 μm, manufactured by Arkema)

(Epoxy Resin-Soluble Thermoplastic Resin)
  Polyethersulfone: PES-5003P (trade name, manufactured by Sumitomo Chemical Co., Ltd., average particle diameter of 20 μm)

(Carbon Fiber)
  Carbon fiber strand: TENAX (registered trademark) IMS65 (trade name, tensile strength of 6000 MPa, elastic modulus of 290 GPa, manufactured by Toho Tenax)

[Heat Treatment Step Of Polyamide Particle]

Treatment A:
  A surface modifying machine (Meteorainbow MR-10) manufactured by Nippon Pneumatic Mfg. Co., Ltd. was used to perform a heat treatment in which each polyamide particle described above was injected into the air heated to 550° C. (hot air flow rate: 1.2 m$^3$/min) at a supply rate of 1.0 kg/hr, thereby obtaining a heat treated polyamide particle.

Treatment B:
  The polyamide particle was subjected to a dry treatment under a stationary condition in the air at 140° C. for 5 hours using a hot air circulating drier, thereby obtaining the heat treated polyamide particle.

[Surface Modifying Step of Polyamide Particle]: Introduction of Epoxy Group to Polyamide Particle Surface Treatment a:
  The polyamide particle (150 g), tetrahydrofuran (1000 ml), and potassium carbonate (10 g) were charged in a flask, and, while the mixture was stirred at room temperature, epichlorohydrin (14 g) was added to the mixture by dripping. Then, reaction was performed in a reflux state for 24 hours. After completion of the reaction, the reaction mixture was allowed to cool to room temperature. The reaction mixture was filtered to collect the particle, and then the collected particle was washed with tetrahydrofuran (room temperature) and waster (70° C.). The washed particle was dried to obtain a surface modified polyamide particle.

Treatment b:

The polyamide particle (150 g), epichlorohydrin (300 g), ion exchange water (1.4 g), and tetramethylammonium chloride (0.33 g) were charged in a flask and heated to 80° C. while stirring to perform a reaction for 48 hours. After completion of the reaction, the reaction mixture was allowed to cool to room temperature. After cooling, 48% aqueous sodium hydroxide solution (7.5 g) was charged and the reaction mixture was stirred at room temperature for 2 hours. The reaction mixture was filtered to collect the particle, and then the collected particle was washed with tetrahydrofuran (room temperature) and waster (70° C.). The washed particle was dried to obtain a surface modified polyamide particle.

Evaluation Method (1) Interlaminar Fracture Toughness Mode I (GIc)

The obtained prepreg was cut into a square with a side of 360 mm, and the cut pieces were laminated by 10 layers in a 0° direction to produce two laminates. In order to make an initial crack, a release sheet was inserted between the two laminates, then both were combined to obtain a prepreg laminate having a lamination configuration of $[0]_{20}$. By using an ordinary vacuum autoclave molding method, the temperature was increased up to 180° C. at a temperature raising rate of 2.0° C./min under a pressure of 0.59 MPa, and then molding was performed for 2 hours under the condition of 180° C. The obtained molded product (fiber-reinforced composite material) was cut into a size of 12.7 mm in width×304.8 mm in length to obtain a test piece for interlaminar fracture toughness mode I (GIc).

As a test method of the GIc, a double cantilever beam interlaminar fracture toughness test method (DCB method) was used. A pre-crack (initial crack) of 12.7 mm from the tip of the release sheet was made, and then a test of further propagating developing the crack was performed. The test was terminated when the crack propagation length reached 127 mm from the tip of the pre-crack. The crosshead speed of the test piece tensile testing machine was set to 12.7 mm/min, and the measurement was performed for n=5.

The crack development length was measured from both end faces of the test piece by using a microscope, and the load and the crack opening displacement were measured to calculate the GIc.

Further, the coefficient of variation (CV) was calculated from data obtained for n=5 using the following Formula (4).

[Mathematical Formula 1]

$$\text{Coefficient of variation }(CV)=[\text{standard deviation of data }(n=5)]/[\text{mean value of data }(n=5)]\times100 \quad \text{Formula (4)}$$

(2) IR Measurement

An IR test sample was cut out from the obtained GIc test piece and subjected to surface exposure by microtome. The sample thus obtained was set to a sample stage and the polyamide particle as an analysis object was subjected to ATR imaging using the following apparatus under the following conditions.

Apparatus in use: VERTEX, HYPERION3000 from Bruker

Measurement conditions: ATR crystal: Ge,

Detector: FPA

Resolution: 8 cm-1,

Number of integration: 512,

Measurement range: 4000 to 900 $cm^{-1}$

Further, E/A was calculated by the following Formula (5)

[Mathematical Formula 2]

$$E/A=[A1300\ cm^{-1}\text{ in each measurement point}]/[A3300\ cm^{-1}\text{ in each measurement point}]-[A1300\ cm^{-1}\text{ in single polyamide particle}]/[A3300\ cm^{-1}\text{ in single polyamide particle}] \quad \text{Formula (5)}$$

A1300 $cm^{-1}$: Maximum height of peaks observed in 1300±50 $cm^{-1}$ with wavenumber range from 2150 to 1950 $cm^{-1}$ as baseline A3300 $cm^{-1}$: Maximum height of peaks observed in 3300±50 $cm^{-1}$ with wavenumber range from 3480 to 3150 $cm^{-1}$ as baseline Note that the epoxy resin, the amine-based curing agent, and the epoxy resin-soluble thermoplastic resin belong in absorption peaks having a peak top in a wavenumber range of 1300±50 $cm^{-1}$. Further, the polyamide belongs in absorption peaks having a peak top in a wavenumber range of 3300±50 $cm^{-1}$.

(3) E/A Integration Values

The relative particle radius was plotted on the horizontal axis and E/A was plotted on the vertical axis to make a plot of relative radius versus E/A. As for the particle surface layer, the plot of relative radius versus E/A in a range of 30% of the relative particle radius from the surface layer, that is, from −1.0 to −0.7 and from 0.7 to 1.0, was approximated by a polynomial of the second to sixth degree having the coefficient of determination value $R^2$ of 0.98 or more, and the approximate curve thus obtained was integrated in the region from −1.0 to −0.7 and the region from 0.7 to 1.0 using the trapezoidal method. Then, the minimum value, the maximum value, and the mean value of these integration values was calculated. Note that, in the calculation of the integration values using the trapezoidal method, the horizontal axis length per section was set to 1/100 of the predetermined relative radius range, that is, 0.003, in this case.

Further, as for the particle central portion, the plot of relative radius versus E/A in a range of plus/minus 30% from the particle center, that is, from −0.3 to 0.3, was subjected to linear approximation, and the approximate straight line thus obtained was integrated in the region from −0.3 to 3.0 using the trapezoidal method. The E/A integration value was thus calculated. Note that, in the calculation of the integration values, similarly to the case of the surface layer, the horizontal axis length per section was set to 1/100 of the predetermined relative radius range, that is, 0.006, in this case.

(4) Crystallinity

The crystallinity (Xc) of the polyamide particle is obtained by separating a crystalline phase and an amorphous phase in a range from 4° to 44° of diffraction angle 2θ in the wide-angle X-ray diffraction measurement and applying integrated intensity of each peak obtained in this range to the following Formula (6).

[Mathematical Formula 3]

$$Xc=Ic/(Ic+Ia)\times100 \quad \text{Formula (6)}$$

Ia: integrated intensity of peak derived from amorphous phase
Ic: integrated intensity of scattering intensity derived from crystalline phase Additional measurement conditions are as follows.
Measurement apparatus: Nano-Viewer (manufactured by Rigaku Corp.)
Generator: ultrax18
Tube voltage/tube current: 45 kV/60 mA
Target: CuKα (λ=0.1542 nm)
Camera length: 95 mm
Measurement time: 10 min
Measurement temperature: room temperature
Detector: imaging plate (5) Epoxy Introduction Ratio (Surface Modification Ratio)

The epoxy group introduction ratio of the polyamide particle surface subjected to the surface modification treatment was measured by the following method. Note that, in the present measurement, the polyamide particle before the production of the epoxy resin composition, that is, before being mixed with the epoxy resin and the curing agent, was used.

The surface modified polyamide particle and benzylamine were reacted to introduce a benzene ring to the epoxy group introduced to the surface of the polyamide particle, and the resulting product was analyzed by time-of-flight secondary ion mass spectrometry (ToF-SIMS). The reaction conditions are as follows.

Benzylamine (3 ml) was added to the polyamide particle (300 mg) and the mixture was mixed by shaking. The dispersion thus obtained was allowed to stand at room temperature for a whole day. Then, the polyamide particle was filtrated from the dispersion thus obtained and washed with acetone several times to remove unreacted benzylamine. Subsequently, the polyamide particle thus obtained was dried to obtain a polyamide particle sample to which the benzene ring serving as a labeled functional group in the time-of-flight secondary ion mass spectrometry (ToF-SIMS) was introduced.

The measurement conditions of the ToF-SIMS are as follows.
Apparatus: TRIFT-IV manufactured by ULVAC-PHI, Inc.
Measurement condition: bunching mode (emphasis on energy resolution)
Measurement condition: primary ion: ion source Aul$^+$, acceleration voltage: 30 kV,
aperture diameter: 20 μm
Measurement mass range: m/z=0.5 to 1850
Measurement area: 50 μm square
Measurement time: 5 to 10 min.

The polyamide particle samples obtained by the above pretreatment was subjected to a positive ion secondary spectrum measurement of the time-of-flight secondary ion mass spectrometry (ToF-SIMS), and a value which was calculated by the following Formula (7) using the obtained result was used as the epoxy introduction ratio of the surface treated particle.

[Mathematical Formula 4]

Epoxy introduction ratio=[$I(m/z=91)$ of surface treated particle]/[$I(m/z=81)$ of surface treated particle]−[$I(m/z=91)$ of surface untreated particle]/[$I(m/z=81)$ of surface untreated particle]   Formula (7)

I(m/z=91): peak intensity of m/z=91
I(m/z=81): peak intensity of m/z=81

(6) Particle Size Distribution and Average Particle Diameter

The particle size distribution of the polyamide particle was measured using a laser diffraction scattering type particle size analyzer (micro-track method) MT3300 manufactured by Nikkiso Co., Ltd. From the particle size distribution result thus obtained, the 50% particle diameter (D50) was used as the average particle diameter.

(7) Aerated Bulk Density

The aerated bulk density of the polyamide particle was measured using a powder characteristics tester "Powder Tester PT-X" manufactured by HOSOKAWA MICRON Corp.

(8) Apparent Density

The apparent density of the polyamide particle was measured by the fixed volume expansion method using a dry-type automatic density analyzer "AccuPyc 1330" manufactured by Shimadzu Corp.

Example 1

The epoxy resin-soluble thermoplastic resin PES-5003P (30 parts by mass) was added to the epoxy resin MY0600 (100 parts by mass), and the mixture was stirred using a planetary mixer at 120° C. for 60 minutes to completely dissolve PES-5003P in the epoxy resin, thereby preparing a resin composition A.

Further, the epoxy resin-soluble thermoplastic resin PES-5003P (26 parts by mass) was added to the epoxy resins MY721 (62 parts by mass) and MY0600 (38 parts by mass), and the mixture was stirred using a planetary mixer at 120° C. for 60 minutes to completely dissolve PES-5003P in the epoxy resins, followed by cooling to a resin temperature of 80° C. or lower, thereby preparing an epoxy resin composition. Subsequently, the polyamide 1010 particle (40 parts by mass) subjected to the heat treatment under the conditions of the treatment A was added to the above epoxy resin composition using a roll mill. The mixture was kneaded for 60 minutes and then kneading was further continued with the curing agent (66 parts by mass) to prepare a resin composition B.

Next, the resin compositions A and B thus prepared were each applied on a release paper by using a film coater, thereby producing two resin films A of 10 g/m$^2$ and two resin films B of 40 g/m$^2$. Next, the resin films B produced in the above were each laminated one by one on both sides of a carbon fiber sheet in which a bundle of carbon fibers is unidirectionally arranged. The carbon fiber sheet was impregnated with the resin by heating and pressing, thereby obtaining a primary prepreg. Subsequently, the primary prepreg was supplied between the two resin films A, followed by heating and pressing, thereby producing a unidirectional prepreg having a basis weight of the carbon fiber of 190 g/m$^2$ and a mass fraction of the matrix resin of 35.0%.

The unidirectional prepreg thus produced was used to produce a composite material and toughness of the composite material was evaluated. The composite material thus obtained showed excellent toughness of GIc: 665 J/m$^2$. These results are shown in Table 1.

Example 2

A resin composition A was prepared similarly to Example 1.

Further, the epoxy resin-soluble thermoplastic resin PES-5003P (26 parts by mass) and the polyamide 1010 particle (40 parts by mass) subjected to the heat treatment under the conditions of the treatment A were added to the epoxy resins MY721 (62 parts by mass) and MY0600 (38 parts by mass), and the mixture was stirred using a planetary mixer at 120° C. for 60 minutes to completely dissolve PES-5003P in the epoxy resins, followed by cooling to a resin temperature of 80° C. or lower, thereby preparing an epoxy resin composition. Subsequently, the curing agent (66 parts by mass) was added to the above epoxy resin composition and kneaded using a roll mill to prepare a resin composition B.

Next, the resin compositions A and B thus prepared were each applied on a release paper by using a film coater, thereby producing two resin films A of 10 g/m² and two resin films B of 40 g/m². Next, the resin films B produced in the above were each laminated one by one on both sides of a carbon fiber sheet in which a bundle of carbon fibers is unidirectionally arranged. The carbon fiber sheet was impregnated with the resin by heating and pressing, thereby obtaining a primary prepreg. Subsequently, the primary prepreg was supplied between the two resin films A, followed by heating and pressing, thereby producing a unidirectional prepreg having a basis weight of the carbon fiber of 190 g/m² and a mass fraction of the matrix resin of 35.0%.

The unidirectional prepreg thus produced was used to produce a composite material and toughness of the composite material was evaluated. The composite material thus obtained showed excellent toughness of GIc: 700 J/m². These results are shown in Table 1.

Example 3

A resin composition A was prepared similarly to Example 1.

Further, the epoxy resin-soluble thermoplastic resin PES-5003P (26 parts by mass) and the polyamide 11 particle (40 parts by mass) subjected to the heat treatment under the conditions of the treatment A were added to the epoxy resins MY721 (80 parts by mass) and EX-201 (20 parts by mass), and the mixture was stirred using a planetary mixer at 120° C. for 60 minutes to completely dissolve PES-5003P in the epoxy resins, followed by cooling to a resin temperature of 80° C. or lower, thereby preparing an epoxy resin composition. Subsequently, the curing agent (66 parts by mass) was added to the above epoxy resin composition and kneaded using a roll mill to prepare a resin composition B.

Next, the resin compositions A and B thus prepared were each applied on a release paper by using a film coater, thereby producing two resin films A of 10 g/m² and two resin films B of 40 g/m². Next, the resin films B produced in the above were each laminated on both sides of a carbon fiber sheet in which a bundle of carbon fibers is unidirectionally arranged. The carbon fiber sheet was impregnated with the resin by heating and pressing, thereby obtaining a primary prepreg. Subsequently, the primary prepreg was supplied between the two resin films A, followed by heating and pressing, thereby producing a unidirectional prepreg having a basis weight of the carbon fiber of 190 g/m² and a mass fraction of the matrix resin of 35.0%.

The unidirectional prepreg thus produced was used to produce a composite material and toughness of the composite material was evaluated. The composite material thus obtained showed excellent toughness of GIc: 648 J/m². These results are shown in Table 1.

Example 4

The resin compositions A and B, and the unidirectional prepreg were prepared on the basis of Example 3 except that the polyamide particle was changed to the polyamide 12 particle subjected to the heat treatment under the conditions of the treatment A.

The unidirectional prepreg thus produced was used to produce a composite material and toughness of the composite material was evaluated. The composite material thus obtained showed excellent toughness of GIc: 718 J/m². These results are shown in Table 1.

Example 5

The resin compositions A and B, and the unidirectional prepreg were prepared on the basis of Example 1 except that the polyamide 1010 particle used in Example 1 was further subjected the heat treatment under conditions of the treatment B.

The unidirectional prepreg thus produced was used to produce a composite material and toughness of the composite material was evaluated. The composite material thus obtained showed excellent toughness of GIc: 403 J/m². These results are shown in Table 1.

Comparative Example 1

The resin compositions A and B, and the unidirectional prepreg were prepared on the basis of Example 1 except that the polyamide particle was changed to the polyamide 1010 particle not subjected to the heat treatment.

The unidirectional prepreg thus produced was used to produce a composite material and toughness of the composite material was evaluated. The composite material thus obtained had poor toughness with the GIc of 333 J/m² as compared with those obtained in the above Examples. These results are shown in Table 1.

Comparative Example 2

The resin compositions A and B, and the unidirectional prepreg were prepared on the basis of Example 3 except that the polyamide particle was changed to the polyamide 12 particle (PA12(A)) manufactured by Arkema, not subjected to the heat treatment.

The unidirectional prepreg thus produced was used to produce a composite material and toughness of the composite material was evaluated. The composite material thus obtained had poor toughness with the GIc of 280 J/m₂ as compared with those obtained in the above Examples. These results are shown in Table 1.

TABLE 1

| | | Example 1 | Example 2 | Example 3 | Example 4 |
|---|---|---|---|---|---|
| PA particle | Polymer species | PA1010 | PA1010 | PA11 | PA12 |
| | Average particle diameter [μm] | 18 | 18 | 25 | 20 |
| | Heat treatment | Treatment A | Treatment A | Treatment A | Treatment A |

TABLE 1-continued

|  |  |  | | | | |
|---|---|---|---|---|---|---|
|  | Crystallinity [%] |  | 31.1 | 31.1 | 42 | 34.4 |
|  | Aerated Bulk Density [g/cm$^3$] |  | 0.415 | 0.415 | 0.378 | 0.411 |
|  | Apparent density [g/cm$^3$] |  | 1.065 | 1.065 | 1.029 | 1.017 |
|  | Aerated Bulk Density/Apparent density |  | 0.39 | 0.39 | 0.37 | 0.40 |
| Resin composition A [Resin coating layer] (parts by mass) | Epoxy resin | MY0600 | 100 | 100 | 100 | 100 |
|  | Thermoplastic resin | PES-5003P | 30 | 30 | 30 | 30 |
| Resin composition B [Reinforcing fiber layer] (parts by mass) | Epoxy resin | EX-201 | — | — | 20 | 20 |
|  |  | MY0600 | 38 | 38 | — | — |
|  |  | MY721 | 62 | 62 | 80 | 80 |
|  | Thermoplastic resin | PES-5003P | 26 | 26 | 26 | 26 |
|  | Curing agent | 3,3'-DDS | 66 | 66 | 66 | 66 |
|  | PA particle |  | 40 | 40 | 40 | 40 |
| Particle/Resin kneading condition | Kneading time [min] |  | 60 | 60 | 60 | 60 |
|  | Kneading temperature [° C.] |  | 80 | 120 | 120 | 120 |
| E/A integration value of molded sample, Curing temperature raising rate: 2° C./min | Surface layer | Minimum value | 0.25 | 0.32 | 0.32 | 0.36 |
|  |  | Mean value | 0.32 | 0.34 | 0.37 | 0.42 |
|  | Inner layer |  | 0.07 | 0.11 | 0.00 | 0.10 |
| CFRP physical properties (Curing temperature rising rate: 2° C./min) | GIc [J/m$^2$] |  | 665 | 700 | 648 | 718 |

|  |  |  | Example 5 | Comp. Example 1 | Comp. Example 2 |
|---|---|---|---|---|---|
| PA particle | Polymer species |  | PA1010 | PA1010 | PA12 |
|  | Average particle diameter [μm] |  | 18 | 20 | 20 |
|  | Heat treatment |  | Treatment A and B | None | None |
|  | Crystallinity [%] |  | 36.4 | 43.0 | 63.4 |
|  | Aerated Bulk Density [g/cm$^3$] |  | 0.451 | 0.308 | 0.291 |
|  | Apparent density [g/cm$^3$] |  | 1.088 | 1.093 | 1.049 |
|  | Aerated Bulk Density/Apparent density |  | 0.41 | 0.28 | 0.28 |
| Resin composition A [Resin coating layer] (parts by mass) | Epoxy resin | MY0600 | 100 | 100 | 100 |
|  | Thermoplastic resin | PES-5003P | 30 | 30 | 30 |
| Resin composition B [Reinforcing fiber layer] (parts by mass) | Epoxy resin | EX-201 | — | — | 20 |
|  |  | MY0600 | 38 | 38 | — |
|  |  | MY721 | 62 | 62 | 80 |
|  | Thermoplastic resin | PES-5003P | 26 | 26 | 26 |
|  | Curing agent | 3,3'-DDS | 66 | 66 | 66 |
|  | PA particle |  | 40 | 40 | 40 |
| Particle/Resin kneading condition | Kneading time [min] |  | 60 | 60 | 60 |
|  | Kneading temperature [° C.] |  | 80 | 80 | 120 |
| E/A integration value of molded sample, Curing temperature raising rate: 2° C./min | Surface layer | Minimum value | 0.17 | 0.39 | 0.96 |
|  |  | Mean value | 0.19 | 0.39 | 1.06 |
|  | Inner layer |  | 0.10 | 0.39 | 1.02 |
| CFRP physical properties (Curing temperature rising rate: 2° C./min) | GIc [J/m$^2$] |  | 403 | 333 | 280 |

Examples 6, 7, and 12

The resin compositions A and B, and the unidirectional prepreg were prepared on the basis of Example 1 except that the surface modified polyamide 1010 particle having the crystallinity as described in Table 2 was used instead of the polyamide 1010 particle used in Example 1.

The unidirectional prepreg thus produced was used to produce a composite material and toughness of the composite material was evaluated. The composite material thus obtained showed excellent toughness as indicated by GIc: 683 J/m$^2$ (Example 6), GIc: 683 J/m$^2$ (Example 7), and GIc: 665 J/m$^2$ (Example 12). Further, in Example 6, the fiber-reinforced composite material was produced by setting the temperature raising rate during curing to 0.5° C./min and 0.2° C./min, and their GIc was measured. Both the composite materials thus obtained showed excellent GIc retention rates as indicated by the GIc of 683 J/m$^2$ and 560 J/m$^2$, respectively. These results are shown in Table 2.

Example 8

The resin compositions A and B, and the unidirectional prepreg were prepared on the basis of Example 4 except that the surface modified polyamide 12 particle having the crystallinity as described in Table 2 was used instead of the polyamide 12 particle used in Example 4.

The unidirectional prepreg thus produced was used to produce a composite material and toughness of the composite material was evaluated. The composite material thus obtained showed excellent toughness as indicated by GIc: 665 J/m$^2$ (Example 8). Further, the fiber-reinforced composite material was produced by setting the temperature raising rate during curing to 0.5° C./min and 0.2° C./min, and their GIc was measured. Both the composite materials thus obtained showed excellent GIc retention rates as indicated by the GIc of 665 J/m$^2$ and 525 J/m$^2$, respectively. These results are shown in Table 2.

Example 9

The resin compositions A and B, and the unidirectional prepreg were prepared on the basis of Example 4 except that the polyamide 12 particle having the crystallinity as described in Table 2 was used instead of the polyamide 12 particle used in Example 4.

The unidirectional prepreg thus produced was used to produce a composite material and toughness of the composite material was evaluated. The composite material thus obtained showed excellent toughness as indicated by GIc: 665 J/m² (Example 9). Further, the fiber-reinforced composite material was produced by setting the temperature raising rate during curing to 0.5° C./min and 0.2° C./min, and their GIc was measured. The GIc of the composite materials thus obtained were 613 J/m² and 420 J/m², respectively. These results are shown in Table 2.

Example 10

The resin compositions A and B, and the unidirectional prepreg were prepared on the basis of Example 1 except that the polyamide 1010 particle having the crystallinity as described in Table 2 was used instead of the polyamide 1010 particle used in Example 1 and was further subjected the heat treatment under conditions of the treatment B.

The unidirectional prepreg thus produced was used to produce a composite material and toughness of the composite material was evaluated. The composite material thus obtained showed excellent toughness of GIc: 473 J/m². These results are shown in Table 2.

Example 11

The resin compositions A and B, and the unidirectional prepreg were prepared on the basis of Example 1 except that the polyamide 1010 particle having the crystallinity as described in Table 2 was used instead of the polyamide 1010 particle used in Example 1.

The unidirectional prepreg thus produced was used to produce a composite material and toughness of the composite material was evaluated. The composite material thus obtained showed excellent toughness as indicated by GIc: 700 J/m². These results are shown in Table 2.

TABLE 2

|  |  |  | Example 6 | Example 7 | Example 8 | Example 9 |
|---|---|---|---|---|---|---|
| PA particle |  | Polymer species | PA1010 | PA1010 | PA12 | PA12 |
|  |  | Average particle diameter [μm] | 18 | 18 | 20 | 20 |
|  |  | Heat treatment | Treatment A | Treatment A | Treatment A | Treatment A |
|  |  | Crystallinity [%] | 34.7 | 32.4 | 37.8 | 31.9 |
|  |  | Aerated Bulk Density [g/cm³] | 0.433 | 0.410 | 0.427 | 0.421 |
|  |  | Apparent density [g/cm³] | 1.065 | 1.065 | 1.031 | 1.017 |
|  |  | Aerated Bulk Density/Apparent density | 0.41 | 0.38 | 0.41 | 0.41 |
| Resin composition A [Resin coating layer] (parts by mass) | Epoxy resin | MY0600 | 100 | 100 | 100 | 100 |
|  | Thermoplastic resin | PES-5003P | 30 | 30 | 30 | 30 |
| Resin composition B [Reinforcing fiber layer] (parts by mass) | Epoxy resin | EX-201 | — | — | 25 | 25 |
|  |  | MY0600 | 38 | 38 | — | — |
|  |  | MY721 | 62 | 62 | — | — |
|  |  | 3,4'-TGDDE |  |  | 75 | 75 |
|  | Thermoplastic resin | PES-5003P | 26 | 26 | 26 | 26 |
|  | Curing agent | 3,3'-DDS | 66 | 66 | 66 | 66 |
|  | PA particle |  | 40 | 40 | 40 | 40 |
| Particle surface treatment |  | Present/Absent | Present | Present | Present | Absent |
|  |  | Treatment method (a/b) | b | a | b | — |
| Surface modification ratio Epoxy group introduction ratio |  | Analysis value of ToF-SIMS | 5.7 | 0.24 | 1.5 | — |
| Particle/Resin kneading condition |  | Kneading time [min] | 60 | 60 | 60 | 60 |
|  |  | Kneading temperature [° C.] | 80 | 80 | 80 | 120 |
| E/A integration value of molded sample, Curing temperature raising rate: 2° C./min | Surface layer | Minimum value | 0.45 | 0.31 | 0.49 | 0.33 |
|  |  | Mean value | 0.45 | 0.38 | 0.57 | 0.34 |
|  | Inner layer |  | 0.11 | 0.15 | 0.06 | 0.07 |
| CFRP physical properties | GIc [J/m²] | Curing temperature rising rate: 2° C./min | 683 | 683 | 665 | 665 |
|  |  | Curing temperature rising rate: 0.5° C./min | 683 | — | 665 | 613 |
|  |  | Curing temperature rising rate: 0.2° C./min | 560 | — | 525 | 420 |
|  | GIc retention rate | Curing temperature rising rate: 0.5° C./min | 100 | — | 100 | 92 |
|  |  | Curing temperature rising rate: 0.2° C./min | 82 | — | 79 | 63 |
|  | CV during GIc measurement Sample prepared at 2° C./min temperature raising |  | 2.3 | 4.2 | 3.0 | 13.8 |

|  |  |  | Example 10 | Example 11 | Example 12 |
|---|---|---|---|---|---|
| PA particle |  | Polymer species | PA1010 | PA1010 | PA1010 |
|  |  | Average particle diameter [μm] | 18 | 18 | 18 |
|  |  | Heat treatment | Treatment A and B | Treatment A | Treatment A |
|  |  | Crystallinity [%] | 34.7 | 29.3 | 29.4 |
|  |  | Aerated Bulk Density [g/cm³] | 0.441 | 0.437 | 0.437 |
|  |  | Apparent density [g/cm³] | 1.065 | 1.056 | 1.056 |
|  |  | Aerated Bulk Density/Apparent density | 0.41 | 0.41 | 0.41 |
| Resin composition A [Resin coating layer] (parts by mass) | Epoxy resin | MY0600 | 100 | 100 | 100 |
|  | Thermoplastic resin | PES-5003P | 30 | 30 | 30 |

TABLE 2-continued

| | | | | | |
|---|---|---|---|---|---|
| Resin composition B [Reinforcing fiber layer] (parts by mass) | Epoxy resin | EX-201 | — | — | — |
| | | MY0600 | 38 | 38 | 38 |
| | | MY721 | 62 | 62 | 62 |
| | | 3,4'-TGDDE | — | — | — |
| | Thermoplastic resin | PES-5003P | 26 | 26 | 26 |
| | Curing agent | 3,3'-DDS | 66 | 66 | 66 |
| | PA particle | | 40 | 40 | 40 |
| Particle surface treatment | | Present/Absent | Absent | Absent | Present |
| | | Treatment method (a/b) | — | — | b |
| Surface modification ratio Epoxy group introduction ratio | | Analysis value of ToF-SIMS | — | — | 1.6 |
| Particle/Resin kneading condition | | Kneading time [min] | 60 | 60 | 60 |
| | | Kneading temperature [° C.] | 80 | 80 | 80 |
| E/A integration value of molded sample, Curing temperature raising rate: 2° C./min | Surface layer | Minimum value | 0.21 | 0.34 | 0.36 |
| | | Mean value | 0.25 | 0.36 | 0.40 |
| | Inner layer | | 0.10 | 0.10 | 0.11 |
| CFRP physical properties | G1c [J/m$^2$] | Curing temperature rising rate: 2° C./min | 473 | 700 | 665 |
| | | Curing temperature rising rate: 0.5° C./min | — | — | — |
| | | Curing temperature rising rate: 0.2° C./min | — | — | — |
| | G1c retention rate | Curing temperature rising rate: 0.5° C./min | — | — | — |
| | | Curing temperature rising rate: 0.2° C./min | — | — | — |
| | | CV during G1c measurement Sample prepared at 2° C./min temperature raising | 12.0 | 12.6 | 1.2 |

What is claimed is:

1. A prepreg comprising:
a reinforcing fiber substrate composed of a reinforcing fiber; and
an epoxy resin composition with which the reinforcing fiber substrate is partially or wholly impregnated, wherein
the epoxy resin composition includes an epoxy resin, an amine-based curing agent, a crystalline polyamide particle that was subjected to heat treatment in gas at a temperature equal to or higher than the melting point of the polyamide particle in advance, and an epoxy resin-soluble thermoplastic resin,
at least one of the epoxy resin, the amine-based curing agent, and the epoxy resin-soluble thermoplastic resin partially permeates into the polyamide particle;
wherein
a crystallinity of the polyamide particle measured by a wide-angle X-ray diffraction method is less than 43%,
an integration value of E/A expressed by the following formula (5') is 0.3 or less in a central portion of the polyamide particles;

E/A=[$A$1300 cm$^{-1}$ in a central portion]/[$A$3300 cm$^{-1}$ in a central portion]−[$A$1300 cm$^{-1}$ in single polyamide particle]/[$A$3300 cm$^{-1}$ in single polyamide particle]   Formula (5'), and an integration value of E/A expressed by Formula (5") is 0.15 or more in a surface layer portion of the polyamide particles;

E/A=[$A$1300 cm$^{-1}$ in a surface layer portion]/[$A$3300 cm$^{-1}$ in a surface layer portion]−[$A$1300 cm$^{-1}$ in single polyamide particle]/[$A$3300 cm$^{-1}$ in single polyamide particle]   Formula (5");

A1300 cm$^{-1}$: Maximum height of peaks observed in 1300±50 cm$^{-1}$ with wavenumber range from 2150 to 1950 cm$^{-1}$ as baseline A3300 cm$^{-1}$: Maximum height of peaks observed in 3300±50 cm$^{-1}$ with wavenumber range from 3480 to 3150 cm$^{-1}$ as baseline.

2. The prepreg according to claim 1, wherein the polyamide particle is a surface modified polyamide particle to which surface an epoxy group is introduced.

3. The prepreg according to claim 1, wherein the crystallinity of polyamide particle is 25% or more and less than 43%.

4. The prepreg according to claim 1, wherein the epoxy resin-soluble thermoplastic resin is polyethersulfone.

5. The prepreg according to claim 1, wherein the polyamide particle is a surface modified polyamide particle that is subjected to an epoxy induction treatment in advance; and an epoxy introduction ratio of the surface modified polyamide particle surface measured by a time-of-flight secondary ion mass spectrometry measurement is greater than 0.

6. The prepreg according to claim 1, wherein aerated bulk density (D1), and apparent density (D2) obtained by a dry density measurement using a fixed volume expansion method, of the polyamide particle satisfy the following Formula (3):

D1/D2≥0.30   Formula (3).

7. A method for producing the prepreg according to claim 1, wherein
the epoxy resin and the crystalline polyamide particle that was subjected to heat treatment in gas at a temperature equal to or higher than the melting point of the polyamide particle in advance are kneaded at a temperature from 70 to 150° C. for 10 minutes or more to produce the epoxy resin composition, and then the reinforcing fiber substrate is impregnated with the epoxy resin composition.

8. A method for producing a fiber-reinforced composite material, wherein the prepreg according to claim 1 is laminated and heated at a pressure from 0.1 to 2 MPa and a temperature from 150 to 210° C. for from 1 to 8 hours.

* * * * *